Feb. 25, 1941. W. F. SERR 2,232,738
EGG POACHER
Filed Aug. 13, 1937
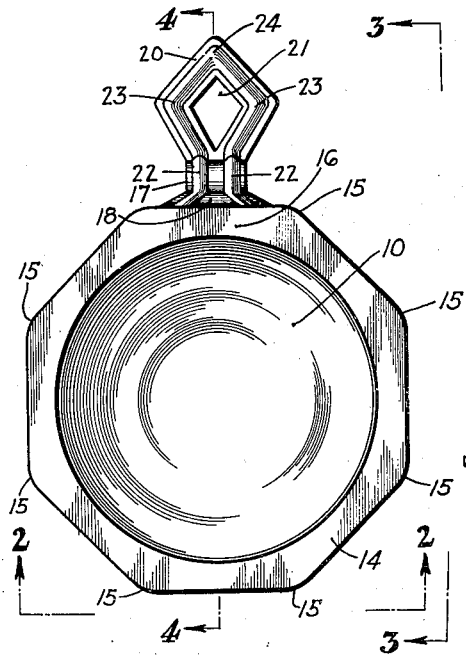
Fig. 1.
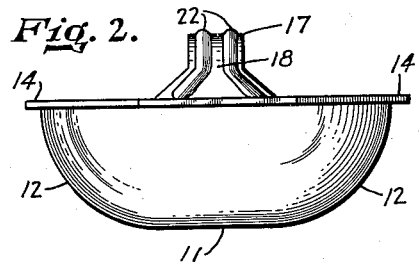
Fig. 2.
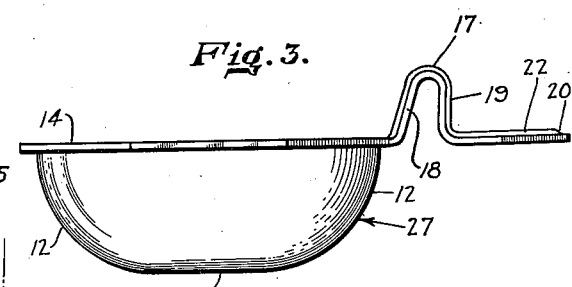
Fig. 3.
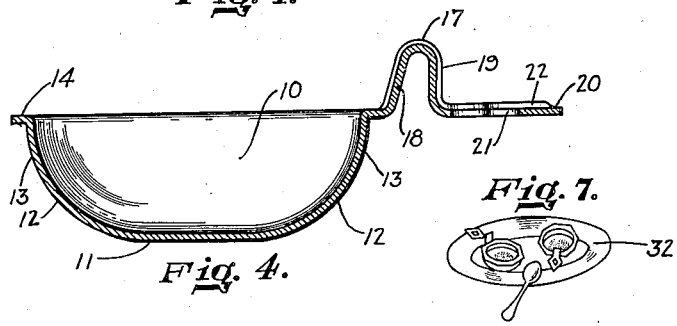
Fig. 4.
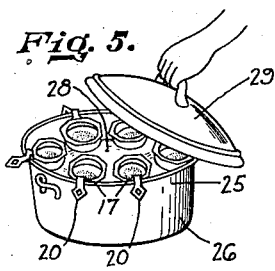
Fig. 5.
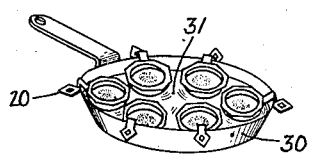
Fig. 6.
Fig. 7.
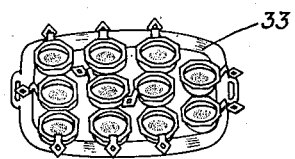
Fig. 8.
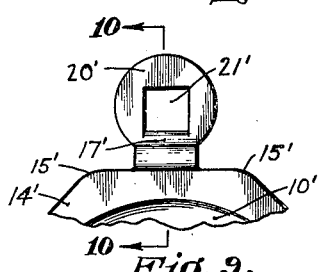
Fig. 9.
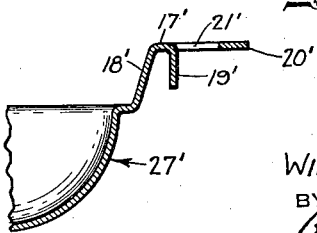
Fig. 10.
INVENTOR
WILLIAM F. SERR
BY
Richards & Geier
ATTORNEYS Patented Feb. 25, 1941

2,232,738

UNITED STATES PATENT OFFICE 2,232,738

EGG POACHER

William F. Serr, New York, N. Y., assignor to Eric Pusinelli, New York, N. Y.

Application August 13, 1937, Serial No. 158,825

2 Claims. (Cl. 53—1)

The present invention relates to an egg poacher and particularly relates to an egg poacher of the type which may be utilized for poaching eggs by the use of steam.

In many types of egg poachers, it is necessary to provide a perforated plate to be placed in or on top of a pot containing boiling water, and it is particularly difficult to remove the egg poachers from such pans when they are hot and at the conclusion of the poaching operation.

Moreover, these pans cause the utensil in which the water is being boiled less adaptable for simultaneous cooking of other foods and in any case, the perforated racks or pans for receiving the egg poachers are particularly difficult to handle and utilize upon utensils containing the boiling water.

It is among the objects of the present invention to provide an improved egg poaching construction in which the egg poacher may be inexpensively manufactured of durable materials at low cost and which construction may be readily handled or utilized in connection with cooking utensils, which utensils may, at the same time, be employed for the cooking of other foodstuffs.

Another object of the present invention is to provide an improved egg poacher which may be utilized singly or placed upon a rack or tray and which, at the same time, may be associated with pots, pans and other utensils to place the eggs in proper position to be poached by steam or hot vapors arising therefrom.

Other objects will be obvious or will appear during the course of the following specification.

In accomplishing the above objects, it has been found most satisfactory to provide a thin sheet metal cup shaped element as of sheet aluminum with an integral handle and clip member.

In one preferred construction, the element has a relatively shallow cup with a flat periphery and from one side of the periphery there extends upwardly a lip or clip inclined slightly away from the axis of the cup which will permit the lower portion of said cup together with the lip to suspend the poaching cup in position on the inclined or vertical side of a pan or pot, as the case may be.

The far end of the lip or clip member is provided with a further extension preferably in the plane of the rim of the cup which extension is provided with a perforation and preferably with a ridged or grooved portion extending around the perforation.

Other objects of this invention will hereinafter be set forth, or will be apparent from the description and the drawing in which are illustrated certain features in connection with applications of the invention.

The invention, however, is not intended to be restricted to any particular construction or arrangement of parts, or to any particular application of any such construction, or to any specific method of operation, or manner of use, or to any of various details thereof, herein shown and described, as the same may be modified in various particulars or be applied in many varied relations without departing from the spirit and scope of the claimed invention, the practical embodiments herein illustrated and described merely showing some of the various features entering into the application of the invention.

Referring to the drawing:

Figure 1 is a top plan view of one form of the egg poacher.

Figure 2 is a front elevational view upon the line 2—2 of Figure 1.

Figure 3 is a side elevational view upon the line 3—3 of Figure 1.

Figure 4 is a cross sectional view upon the line 4—4 of Figure 1.

Figures 5 and 6 are diagrammatic views upon a small scale and in perspective showing the application of the egg poachers of the present invention to various types of cooking utensils.

Figures 7 and 8 show the manner in which the egg poachers may be utilized for serving of the poached eggs.

Figures 9 and 10 illustrate an alternative embodiment of clip and handle means, Figure 9 being a fragmentary top elevational view and Figure 10 being a transverse sectional view upon the line 10—10 of Figure 9.

Referring to Figures 1 to 4, the cup 10 is provided with a flat bottom 11, curved lower side portions 12 and substantially vertical side walls 13 which terminate in a flat rim portion 14, which as indicated in Figure 1, may be octagonal or other polygonal shape, the corners 15 constituting points of support, if needed, for the cup upon various types of vessels or articles.

The rear portion 16 of the rim is provided with an upstanding U-shaped member 17 having the front portion 18 and the rear portion 19, the front portion 18 being inclined to the rear and the rear portion 19 being substantially parallel to the front portion 18, as shown best in Figures 3 and 4.

From the bottom of the rear portion 19 extends the hand grip member or handle 20, preferably in the plane of the rim 14, said handle member 20 receiving the perforation 21 which, as indicated in Figure 1 is of diamond shape but may be of other shapes and forms.

It will be noted that the parallel ridges 22 extend over the U-shaped member 17 and continue at 23 until they meet at 24, the portions 23 conforming to the shape of the perforations 21.

The cup, as shown, may be conveniently stamped out of aluminum or other similar sheet metal and it is of light weight and may be formed of relatively thin gauge plate stock, the perforation 21 and the ridges 22, 23 assure radiation of the heat and limit the amount of heat which may be conducted to the fingers of the handle.

In utilizing the device, as shown in Figures 1 to 4, the U-shaped elements 17, by the handles 20 may be conveniently clipped upon or placed upon the side wall 25 of the cooking utensil 26.

When used on the utensil 26 the rear portion 20 of the cup, at 27, will contact the interior of the side wall 25 and will cooperate with the inclined portion 18 of the clip 17. This will position the cup with the flange of the cup 14 inclined slightly downwardly toward the center of the utensil, which as indicated at 28, may contain another material being cooked.

This support for the cup is found to be most satisfactory to insure speedy poaching of the eggs and in further assuring stability of the egg poacher when associated with a cooking utensil of the type indicated in Figure 5.

It will be noted that the clip 17 closely fits the side wall 25 of the utensil 26 so that the lid 29 may be applied in spite of the fact that the egg poachers are in position.

In Figure 6, the egg poachers are shown associated with a pan 30 which may contain a boiling or frying material, so that the steam will contact with the egg cups and poach the eggs.

The handle member 20 at all times may be conveniently handled since it will cool off speedily, and moreover, will be positioned outside of the vessels 26 and 30 and not be exposed directly to the steam.

The persons removing the cups may grasp these handles without placing his or her hands in the steam or vapors arising from the cooking food 28 of Figure 5 or 31 of Figure 6, in view of the thin gauge of the metal, it is possible to poach the eggs by use of steam alone without the necessity of employing boiling water.

It will be noted by comparing Figures 5 and 6 that the shape of the clip 17 enables the cups to be satisfactorily employed either with vessels with straight side walls, as indicated in Figure 5 at 25, or with upwardly and outwardly extending side walls as indicated at 30 in Figure 6.

Referring to Figures 7 and 8, it is apparent that the egg cups may be utilized for directly serving the poached eggs without the need of using separate trays or dishes, which must also be washed.

Figure 7 illustrates a plate and Figure 8 illustrates a tray receiving the poached egg cups.

In the embodiment of Figures 9 and 10, similarly functioning parts being indicated by the same numerals primed, the clip or U-shaped member 17' is formed in part by a downwardly extending tang 19' cut out of the opening 21' in the handle 20'.

It will be noted that the leg 18' of the clip 17' is inclined upwardly and to the rear as in the construction of Figures 1 to 4.

It will be noted also that the opening 21' is of square shape rather than of diamond shape, as shown in Figure 1.

An important feature of the present invention resides in the fact that the U-shaped handle 17 with the legs 18 and 19 will contact with the edge of the pan 30 or the wall 25 of the cooking vessel 26 (see Figures 5 and 6) and form a three point support. As seen in Figures 1 and 3, this three point support will result from the contact of the two lower corners of the element or leg member 18 and the bend of the U-structure 17.

It is apparent that the specific illustrations shown above have been given by way of illustration and not by way of limitation and that the structures above described are subject to wide variation and modification without departing from the scope or intent of the invention, all of which variations and modifications are to be included within the scope of the present invention.

Certain subject matter herein disclosed but not claimed, is disclosed and claimed in my co-pending application, Serial No. 337,750, filed May 29, 1940.

What is claimed is:

1. An individual, egg-size cup for a steaming egg cooker, said cup comprising an imperforate bowl and a handle integral with and extending laterally from said bowl, said handle having a tang bent from the material of the handle intermediate the ends thereof to form with the adjacent portion of the handle an inverted U-shaped clip for engaging the rim of a receptacle to suspend the cup in the receptacle, the portion of the handle from which the tang is bent forming a perforated finger grip.

2. An individual, egg-size cup for a steaming egg cooker, said cup comprising an imperforate thin metal bowl and a handle extending laterally from said bowl, said handle having a tang bent from the material of the handle intermediate the ends thereof to form with the adjacent portion of the handle an inverted U-shaped clip for engaging the rim of a receptacle to suspend the cup in the receptacle, and a distal portion extending beyond said tang and providing means for handling said cup.

WILLIAM F. SERR.